(12) United States Patent
Gubbi Lakshminarasimha et al.

(10) Patent No.: US 10,964,076 B2
(45) Date of Patent: Mar. 30, 2021

(54) METHOD AND SYSTEM FOR SOLVING INVERSE PROBLEMS IN IMAGE PROCESSING USING DEEP DICTIONARY LEARNING (DDL)

(71) Applicant: Tata Consultancy Services Limited, Mumbai (IN)

(72) Inventors: Jayavardhana Rama Gubbi Lakshminarasimha, Bangalore (IN); Karthik Seemakurthy, Bangalore (IN); Sandeep Nk, Bangalore (IN); Ashley Varghese, Bangalore (IN); Shailesh Shankar Deshpande, Bangalore (IN); Mariaswamy Girish Chandra, Bangalore (IN); Balamuralidhar Purushothaman, Bangalore (IN); Angshul Majumdar, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 54 days.

(21) Appl. No.: 16/504,196

(22) Filed: Jul. 5, 2019

(65) Prior Publication Data
US 2020/0013201 A1 Jan. 9, 2020

(30) Foreign Application Priority Data
Jul. 6, 2018 (IN) .............................. 201821025418

(51) Int. Cl.
*G06T 11/00* (2006.01)
*G06T 3/40* (2006.01)
*G06T 7/00* (2017.01)

(52) U.S. Cl.
CPC .......... *G06T 11/006* (2013.01); *G06T 3/4053* (2013.01); *G06T 7/0002* (2013.01); *G06T 2207/20021* (2013.01); *G06T 2207/20081* (2013.01); *G06T 2207/30168* (2013.01)

(58) Field of Classification Search
CPC ... G06T 11/006; G06T 3/4053; G06T 7/0002; G06T 2207/20021; G06T 2207/20081; G06T 2207/30168
USPC ......................................................... 382/159
See application file for complete search history.

(56) References Cited

U.S. PATENT DOCUMENTS

| | | | |
|---|---|---|---|
| 9,827,507 B2 * | 11/2017 | Muthyala | ................ G06T 19/00 |
| 2004/0266525 A1 * | 12/2004 | Adachi | ................... A63F 13/10 463/31 |
| 2007/0239169 A1 * | 10/2007 | Plaskos | .................. A61B 90/39 606/96 |
| 2010/0113147 A1 * | 5/2010 | Chosogabe | ............. A63F 13/10 463/30 |
| 2010/0150526 A1 * | 6/2010 | Rose | .................... G11B 27/034 386/352 |

(Continued)

*Primary Examiner* — Jerome Grant, II
(74) *Attorney, Agent, or Firm* — Finnegan, Henderson, Farabow, Garrett & Dunner, LLP

(57) ABSTRACT

This disclosure relates generally to image processing, and more particularly to method and system for image reconstruction using deep dictionary learning (DDL). The system collects the degraded image as test image and processes the test image to extract sparse features from the test image, at different levels, using dictionaries. The extracted sparse features and data from the dictionaries are used by the system to reconstruct the HR image corresponding to the test image.

9 Claims, 5 Drawing Sheets

(56) References Cited

U.S. PATENT DOCUMENTS

| | | | |
|---|---|---|---|
| 2010/0201069 A1* | 8/2010 | Lam | A63F 3/00643 |
| | | | 273/237 |
| 2011/0244958 A1* | 10/2011 | Nimura | A63F 13/5258 |
| | | | 463/31 |
| 2014/0300547 A1* | 10/2014 | Hosenpud | G06F 3/04815 |
| | | | 345/158 |
| 2017/0043269 A1* | 2/2017 | Baker | A63H 3/48 |
| 2018/0117450 A1* | 5/2018 | Forefalt | G06T 13/80 |
| 2018/0121759 A1 | 5/2018 | Gabrani et al. | |
| 2018/0144214 A1 | 5/2018 | Hsieh et al. | |

\* cited by examiner

METHOD AND SYSTEM FOR SOLVING INVERSE PROBLEMS IN IMAGE PROCESSING USING DEEP DICTIONARY LEARNING (DDL)

PRIORITY CLAIM

This U.S. patent application claims priority under 35 U.S.C. § 119 to India Application No. 201821025418, filed on Jul. 6, 2018. The entire contents of the aforementioned application are incorporated herein by reference.

TECHNICAL FIELD

This disclosure relates generally to image processing, and more particularly to method and system for image reconstruction using deep dictionary learning (DDL).

BACKGROUND

An 'inverse problem', at a broad level, refers to a process of calculating from a set of observations, one or more factors that produced the observations (i.e. starting with 'results' and calculating/identifying 'causes'). An example of 'inverse problem' in image processing domain is image reconstruction. Image reconstruction is required to reconstruct an image when data/content of the image is lost/deteriorated due to one or more reasons. For example, due to factors such as but not limited to malfunctioning of image sensors, an image captured may not contain all data. Similarly, part of images captured and stored in a database also may be lost/deteriorated due to one or more factors. In digital image processing, appropriate algorithms are used to reverse the deterioration or to replace lost parts. For example, in the case of image processing, super resolution is a mechanism used for improving the spatial resolution of input test image. Other inverse imaging applications include (but not limited to) inpainting (estimation of unknown values in images) and denoising (removal of unwanted noise in the image).

The inventors here have recognized several technical problems with such conventional systems, as explained below. Existing systems which are used for solving inverse problems such as image reconstruction use different approaches/methods. For example, some of the existing systems use machine learning techniques to solve the inverse problem. However, the machine learning systems require significant amount of training data, in the absence of which the system may not be able to solve the inverse problems. Unavailability of training data or amount of the training data available being less than a required quantity can be a concern, especially when missing information is large.

SUMMARY

Embodiments of the present disclosure present technological improvements as solutions to one or more of the above-mentioned technical problems recognized by the inventors in conventional systems. For example, in one embodiment, a method for image processing is provided. In this process, at least one image is fetched as a test image for processing. The test image is then divided into a plurality of overlapping patches. Each of the plurality of overlapping patches are arranged as a column of a matrix (T). Then at least one sparse feature is extracted from each level of the matrix (T), using a plurality of dictionaries, wherein at each of a plurality of levels in T frequency content corresponding to the patches is stored. Further, an estimate of the High Resolution (HR) image corresponding to the test image is reconstructed using the at least one sparse feature extracted from each of a plurality of levels in the matrix T.

In another embodiment, a system for image processing is provided. The system includes one or more hardware processors; one or more communication interfaces; and one or more memory modules storing a plurality of instructions. The plurality of instructions when executed cause the one or more hardware processors to fetch at least one image as a test image. The system divides the test image into a plurality of overlapping patches. The system then arranges each of the plurality of overlapping patches as a column of a matrix (T). Then at least one sparse feature is extracted from each level of the matrix (T), using a plurality of learned dictionaries, wherein at each of a plurality of levels in T frequency content corresponding to the patches is stored. Further, an estimate of the High Resolution (HR) image corresponding to the test image is reconstructed using the at least one sparse feature extracted from each of a plurality of levels in the matrix T.

In yet another embodiment, a non-transitory computer readable medium for image processing is provided. Steps involved in the image processing being carried out by the computer program product is explained herein. In this process, at least one image is fetched as a test image for processing. The test image is then divided into a plurality of overlapping patches. Each of the plurality of overlapping patches are arranged as a column of a matrix (T). Then at least one sparse feature is extracted from each level of the matrix (T), using a plurality of dictionaries, wherein at each of a plurality of levels in T frequency content corresponding to the patches is stored. Further, an estimate of the High Resolution (HR) image corresponding to the test image is reconstructed using the at least one sparse feature extracted from each of a plurality of levels in the matrix T.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
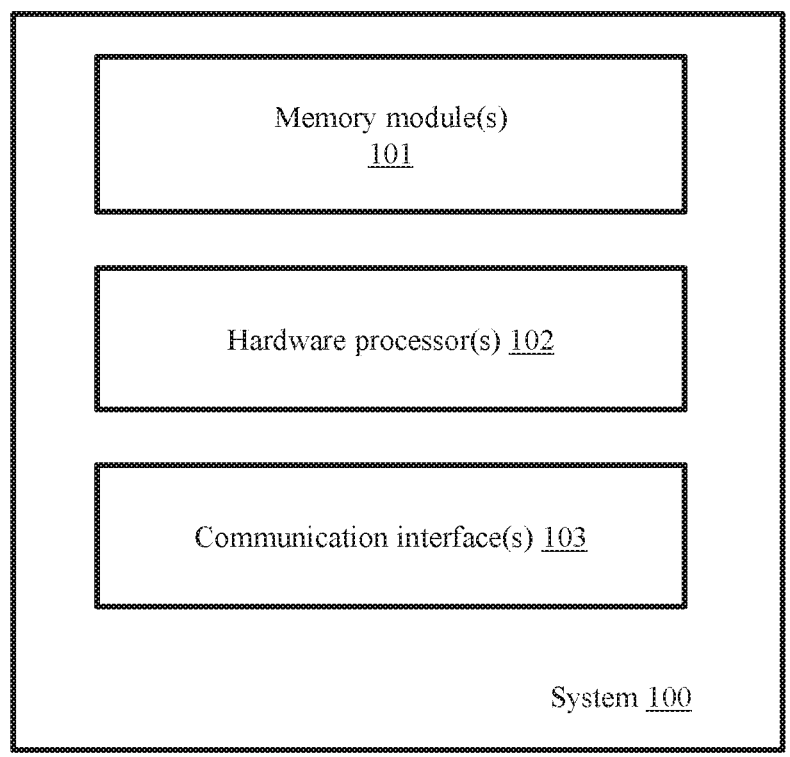
FIG. 1 illustrates an exemplary system for image reconstruction, according to some embodiments of the present disclosure.

FIG. 1 illustrates an exemplary system for image reconstruction, according to some embodiments of the present disclosure. In an embodiment, the system 100 includes one or more hardware processors 102, communication interface(s) or input/output (I/O) interface(s) 103, and one or more data storage devices or memory modules 101 operatively coupled to the one or more hardware processors 102. The one or more hardware processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory module(s) 101.

In an embodiment, the system 100 includes one or more data storage devices or memory module(s) 101 operatively coupled to the one or more hardware processors 102 and is configured to store instructions configured for execution of steps of the method 200 by the one or more hardware processors 102.

The system 100 can be configured to perform image reconstruction, for a test image collected as input. An assumption made is that the test image fed as input to the system 100 is a degraded image, wherein extent of degradation varies from one test image to another. Here the term 'degraded image' refers to an image which has lost some contents of it due to one or more reasons. The degradation in the test image is either due to the missing information (streaks) or due to the loss of spatial resolution. The system 100 uses a Deep Dictionary Learning (DDL) based mechanism (stored in the memory 101) which when executed restores the test image from degradation. The system 100 executes the method explained in description of FIG. 2 and FIG. 3, so as to reconstruct an estimate of High Resolution (HR) image corresponding to the test image. Here the term 'reconstruct' does not imply that a reference of the estimate of the HR image already exists. Instead, the estimate of the HR image corresponding to the test image, is generated/constructed by the system 100. Here 'reconstruction' refers to the 'estimate construction/generation'.

Figure 2:
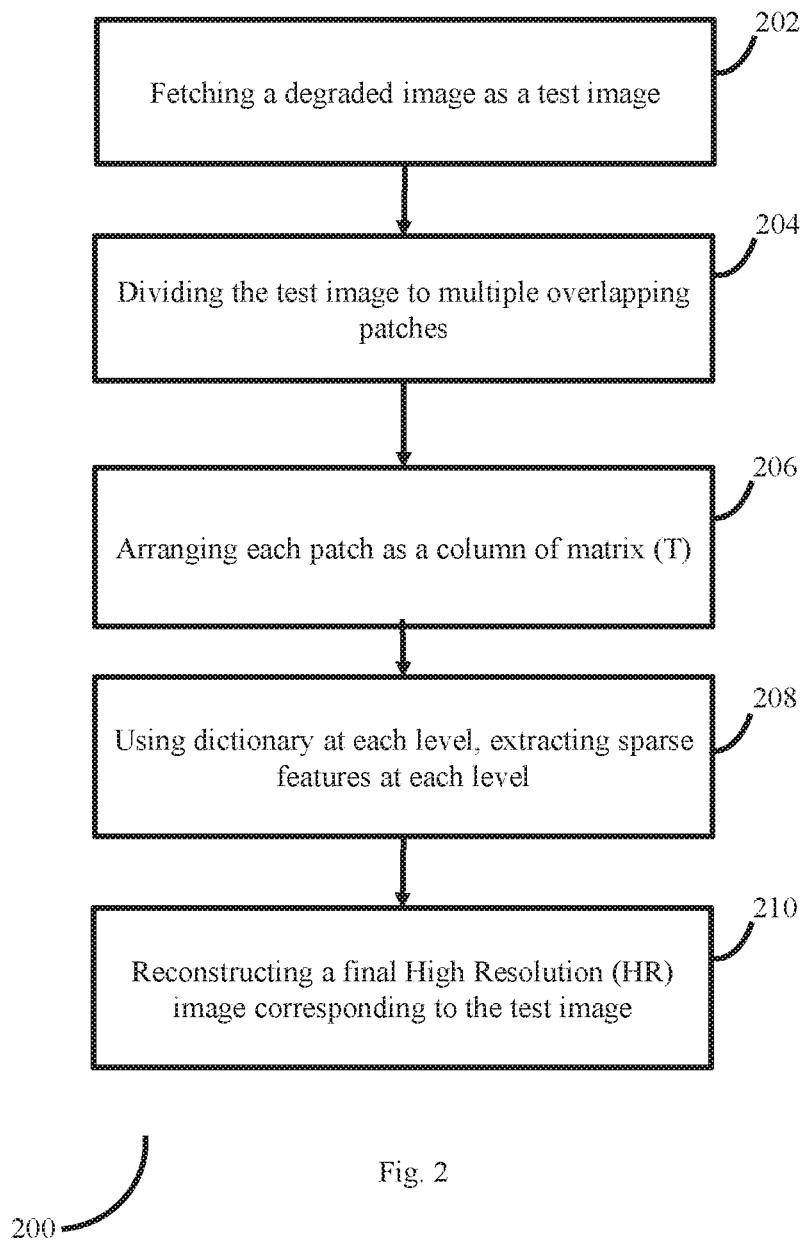
FIG. 2 is a flow diagram depicting steps involved in the process of reconstructing an image, by the system of FIG. 1, according to some embodiments of the present disclosure.

FIG. 2 is a flow diagram depicting steps involved in the process of reconstructing an image, by the system of FIG. 1, according to some embodiments of the present disclosure. A degraded image is fetched (202) as a test image by the system 100. In an embodiment, the system 100 may be able to fetch and process multiple test images at once. However, the image reconstruction is explained by considering one test image. The system 100 divides (204) the test image to multiple overlapping patches. In an embodiment, the number of patches may be pre-defined. In another embodiment, the number of patches may be dependent on one or more characteristics (such as but not limited to image size in terms of pixels), and may be dynamically decided by the system 100. The patches are then arranged (206) as columns of a matrix 'T'.

The system 100 processes the test image for reconstruction, using data in a plurality of learned dictionaries, wherein the plurality of dictionaries are used to extract sparse features at different levels and relation of the sparse features with the corresponding level. There may be two different scenarios:

Scenario 1: Clean Data Available for Generating Dictionaries:

The clean data may be a High Resolution (HR) and/or Low Resolution (LR) image pairs. When the clean data is available, the system 100 processes the clean data to generate 'learned dictionaries' at different levels and mapping functions for corresponding sparse features. The learned dictionaries may be then used to process the test image further and to extract (208) sparse features from the test image.

Scenario 2: Clean Data is Not Available for Generating Dictionaries:

In this scenario wherein a clean data is not available for generating dictionaries, the system 100 generates the dictionaries from the test image(s) itself, which are further in turn used for reconstruction of test image by removing degradations from the test image. In an embodiment, the dictionaries are generated using a Deep Dictionary Learning (DDL) approach.

The dictionary at each level possesses data pertaining to a plurality of sparse features extracted from the test image at that level, and relation of the extracted sparse features of the test image with that of the corresponding HR image can be established through estimated mapping functions. The nature of these mapping functions can be either linear or non-linear. The choice of mapping functions can be based on the nature of input images. The dictionaries generated at different levels are then used to further extract (210) sparse features from the test image, at different levels, which in turn are used for reconstructing a final High Resolution (HR) image corresponding to the test image. In various embodiments, steps in method 200 may be performed in the same order or in different orders. In another embodiment, one or more of the steps in method 200 may be skipped. For instance, for the case of inpainting, the mapping of features step can be skipped.

Figure 3A:
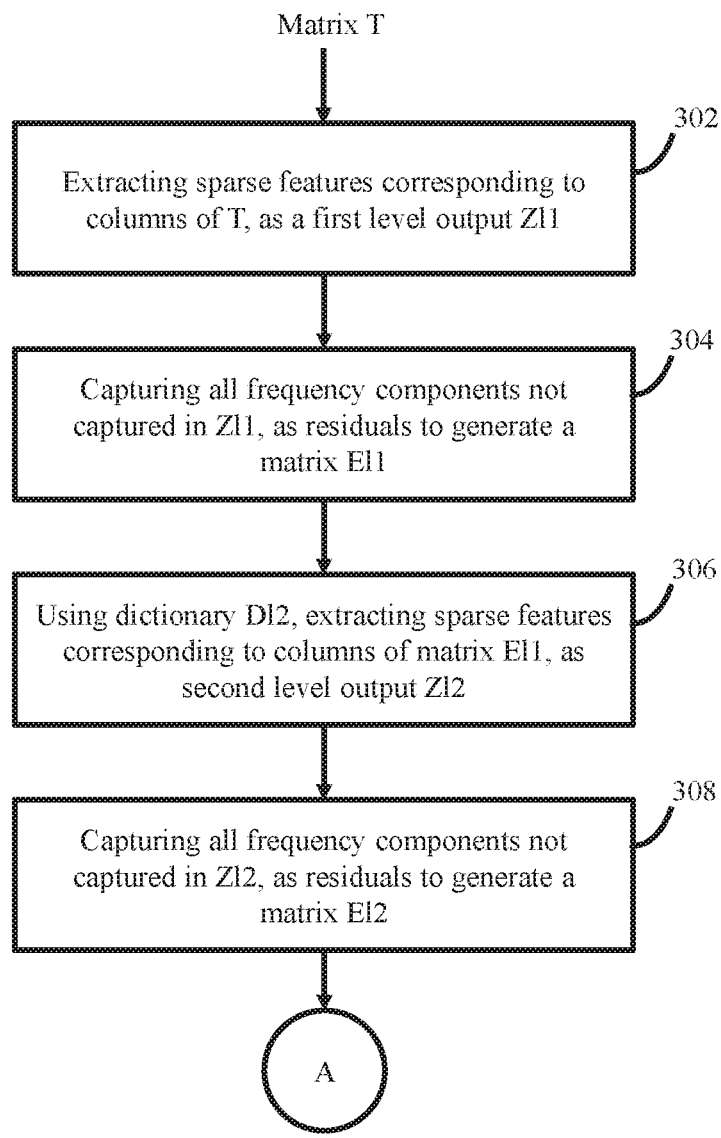
FIGS. 3A and 3B (collectively referred to as FIG. 3 and method 300) are flow diagrams depicting steps involved in the process of extracting sparse features for reconstructing the image, using the system of FIG. 1, in accordance with some embodiments of the present disclosure.
Figure 3B:
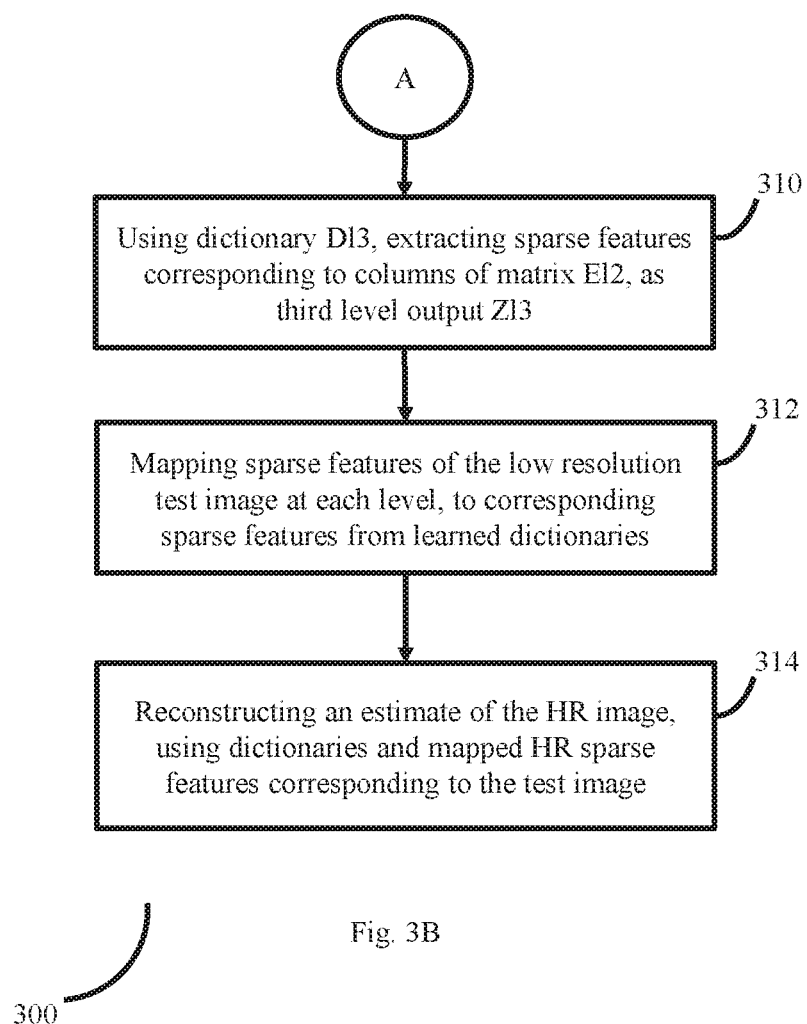

FIGS. 3A and 3B (collectively referred to as FIG. 3 and method 300) are flow diagrams depicting steps involved in the process of extracting sparse features for reconstructing the image, using system of FIG. 1, in accordance with some embodiments of the present disclosure. In the matrix T, frequency components corresponding to the overlapping patches extracted from the test image are stored at different levels. From the matrix T that stores patches of the test image, sparse features corresponding to columns of T (i.e. patches of the test image) are extracted (302) to generate a first level output ZI1. In practice image processing systems do not capture all frequency components from an image in a single step processing. As a result, in order to capture the frequency components that are not captured at one stage, then image is processed further in next level. Here the system 100 captures (304) a plurality of frequency components that were not captured in the ZI1 output, as residuals, to generate a matrix of residuals EI1. Further, using a dictionary DI2 of the plurality of dictionaries, sparse level features corresponding to columns of EI1 are extracted (306), as a second level output ZI2. The system 100 further captures (308) all frequency components that were not captured in the ZI2 output, as residuals, to generate a matrix of residuals EI2.

Further, using a dictionary DI3 of the plurality of dictionaries, sparse level features corresponding to columns of EI2 are extracted (310), as a third level output ZI3. Further, the sparse features extracted at each level are mapped (312) to corresponding sparse features at the same levels from the learned dictionaries. By using the mapping functions at different levels, sparse features corresponding to input test image are mapped to HR features. In another embodiment, this step of mapping can be skipped.

Further, based on the learnt dictionaries and the mapped sparse features from the HR image, the system 100 reconstructs (314) an estimate of a High Resolution (HR) image corresponding to the test image. In order to reconstruct the estimate of the HR image, the system 100 generates one HR component each from each of the plurality of levels by taking a weighted average of corresponding dictionary columns according to the mapped extracted sparse features. Further the HR components from each of the plurality of levels are combined to generate the estimate of the HR image. Contents of the HR components i.e. the patches can be rearranged to generate the estimate of the HR image. The contents of the estimate of the HR image can be rearranged to generate a HR image corresponding to the test image. In an embodiment, though the method 300 in FIG. 3 covers dictionary generation and feature extraction at 3 levels, the number of levels can vary (increase or decrease) depending on the frequency content of input test image. FIG. 3 is not intended to impose any restriction on scope of embodiments disclosed herein. The method explained with description of FIG. 3 is depicted in FIG. 4 as an example.

Figure 4:
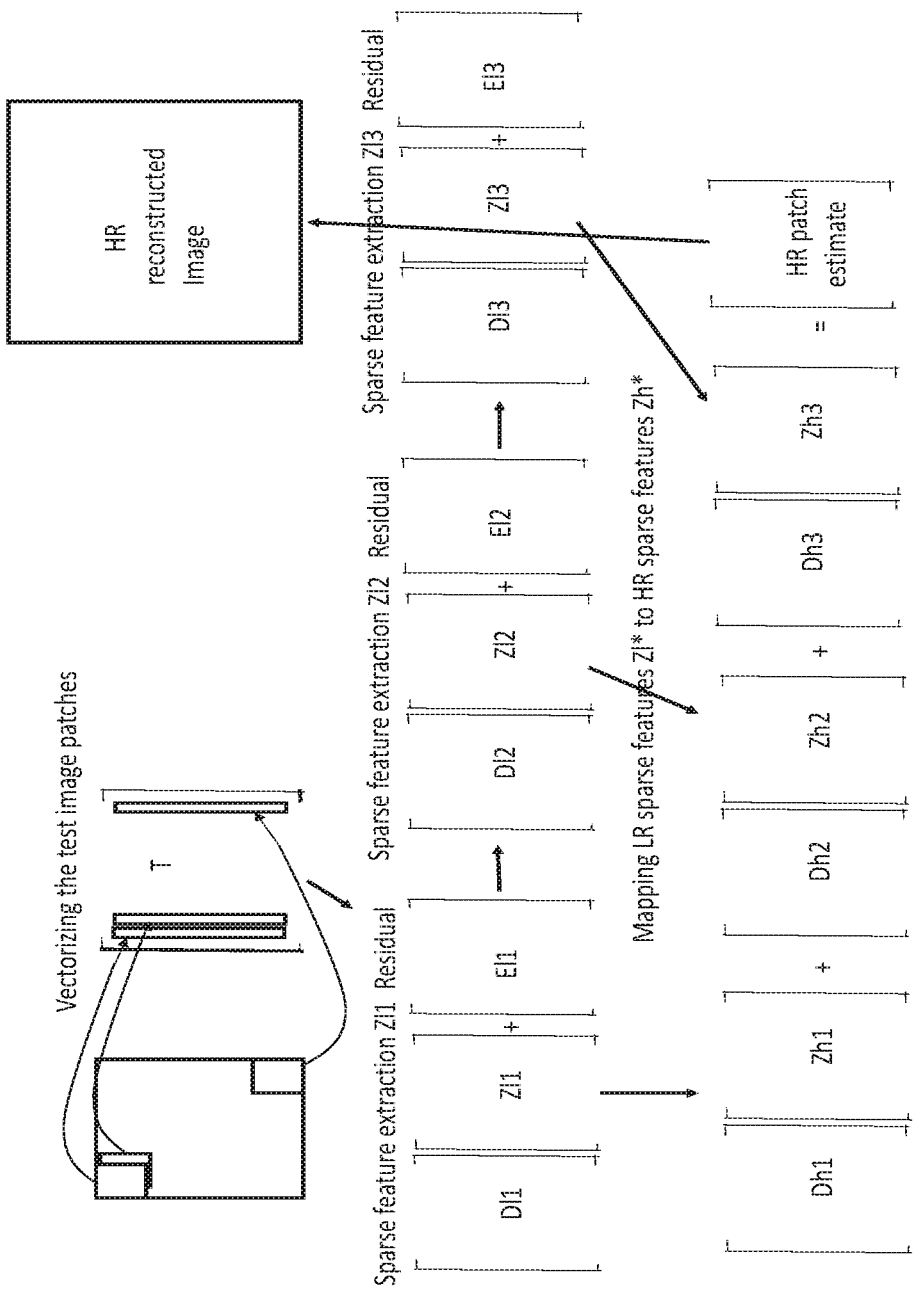
FIG. 4 depicts an example of image reconstruction using the system of FIG. 1, in accordance with some embodiments of the present disclosure.

FIG. 4 depicts an example of image reconstruction using system of FIG. 1, in accordance with some embodiments of the present disclosure. By vectorizing the test image, a plurality of overlapping patches are obtained. Further by following the process elaborated in description of FIG. 3, the system 100 generates the first level output ZI1, the second level output ZI2, and the third level output ZI3. This is depicted in 2nd row of the FIG. 4. Further, features in the output at each level is mapped against corresponding features of the HR image in the plurality of the learned dictionaries. Further the system 100 generates one HR component each from each of the plurality of levels by taking a weighted average of corresponding dictionary columns according to the mapped extracted sparse features. Further the HR components from each of the plurality of levels are combined to generate the estimate of the HR image patches. These patches can be rearranged to generate the HR image (the HR reconstructed image in FIG. 4) estimate corresponding to the test image.

In various embodiments, steps of method 300 may be performed in the same order or in any different order. In another embodiment, one or more steps of method 300 may be skipped.

Inverse problems in image processing involve modelling an underlying system so that the unknown values can be estimated. Mechanisms such as super-resolution, inpainting, denoising and so on involve the modelling of the underlying system to re-estimate the unknown values. It is worthwhile to note that the underlying model developed using the above process could be used for other applications such as but not limited to clustering and classification. In doing so, use of the dictionaries and residuals calculated using the described method becomes critical.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for image processing, comprising:
fetching at least one image as a test image;
dividing the test image into a plurality of overlapping patches;
arranging each of the plurality of overlapping patches as a column of a matrix (T);

extracting at least one sparse feature from each level of the matrix (T), using a plurality of learned dictionaries, wherein at each of a plurality of levels in T frequency content corresponding to the patches is stored; and reconstructing an estimate of the High Resolution (HR) image corresponding to the test image, using the at least one sparse feature extracted from each of the plurality of levels of the matrix (T), comprising:

extracting sparse features corresponding to columns of T, as a first level output (Z11);

capturing from T, all frequency components that are not captured in Z11, as residuals, to generate a matrix E11;

extracting sparse features corresponding to columns of E11, as a second level output (Z12);

capturing from E11, all frequency components that are not captured in Z12, as residuals, to generate a matrix E12;

extracting sparse features corresponding to columns of E12, as a third level output (Z13);

mapping the sparse features extracted as the first level output, the second level output, and the third level output, to corresponding sparse features from the plurality of learned dictionaries; and reconstructing the estimate of the HR image using the plurality of learned dictionaries and mapped extracted sparse features of the test image.

2. The method as in claim 1, wherein reconstructing the estimate of the HR image comprises:

generating a HR component at each of the plurality of levels by taking a weighted average of values in a plurality of dictionary columns corresponding to each level, according to the mapped extracted sparse features; and combining the HR components from each of the plurality of levels.

3. The method as claimed in claim 1, wherein the dictionary is generated using Deep Dictionary Learning (DDL) method, using data from the test image.

4. A system for image processing, comprising:
one or more hardware processors;
one or more communication interfaces; and
one or more memory modules storing a plurality of instructions, the plurality of instructions when executed cause the one or more hardware processors to:
fetch at least one image as a test image;
divide the test image into a plurality of overlapping patches;
arrange each of the plurality of overlapping patches as a column of a matrix (T);
extract at least one sparse feature from each level of the matrix (T), using a plurality of learned dictionaries, wherein at each of a plurality of levels in T frequency content corresponding to the patches is stored; and
reconstruct an estimate of the High Resolution (HR) image corresponding to the test image, using the at least one sparse feature extracted from each of the plurality of levels of the matrix (T), by:
extracting sparse features corresponding to columns of T, as a first level output (Z11);
capturing from T, all frequency components that are not captured in Z11, as residuals, to generate a matrix E11;
extracting sparse features corresponding to columns of E11, as a second level output (Z12);
capturing from E11, all frequency components that are not captured in Z12, as residuals, to generate a matrix E12;
extracting sparse features corresponding to columns of E12, as a third level output (Z13);
mapping the sparse features extracted as the first level output, the second level output, and the third level output, to corresponding sparse features from the plurality of learned dictionaries; and
reconstructing the estimate of the HR image using the plurality of learned dictionaries and mapped extracted sparse features of the test image.

5. The system as in claim 4, wherein the system reconstructs the estimate of the HR image by:

generating a HR component at each of the plurality of levels by taking a weighted average of values in a plurality of dictionary columns corresponding to each level, according to the mapped extracted sparse features; and combining the HR components from each of the plurality of levels.

6. The system as claimed in claim 4, wherein the system generates the dictionary using a Deep Dictionary Learning (DDL) method, using data from the test image.

7. A non-transitory computer readable medium for image processing, comprising:
fetching at least one image as a test image;
dividing the test image into a plurality of overlapping patches;
arranging each of the plurality of overlapping patches as a column of a matrix (T);
extracting at least one sparse feature from each level of the matrix (T), using a plurality of learned dictionaries, wherein at each of a plurality of levels in T frequency content corresponding to the patches is stored; and
reconstructing an estimate of the High Resolution (HR) image corresponding to the test image, using the at least one sparse feature extracted from each of the plurality of levels of the matrix (T), comprising:
extracting sparse features corresponding to columns of T, as a first level output (Z11);
capturing from T, all frequency components that are not captured in Z11, as residuals, to generate a matrix E11;
extracting sparse features corresponding to columns of E11, as a second level output (Z12);
capturing from E11, all frequency components that are not captured in Z12, as residuals, to generate a matrix E12;
extracting sparse features corresponding to columns of E12, as a third level output (Z13);
mapping the sparse features extracted as the first level output, the second level output, and the third level output, to corresponding sparse features from the plurality of learned dictionaries; and
reconstructing the estimate of the HR image using the plurality of learned dictionaries and mapped extracted sparse features of the test image.

8. The non-transitory computer readable medium as in claim 7, wherein reconstructing the estimate of the HR image comprises:

generating a HR component at each of the plurality of levels by taking a weighted average of values in a plurality of dictionary columns corresponding to each level, according to the mapped extracted sparse features; and combining the HR components from each of the plurality of levels.

9. The non-transitory computer readable medium as claimed in claim 7, wherein the dictionary is generated using Deep Dictionary Learning (DDL) method, using data from the test image.

\* \* \* \* \*